(12) United States Patent
Skalecki

(10) Patent No.: US 10,355,935 B2
(45) Date of Patent: Jul. 16, 2019

(54) REDUCED LINK BANDWIDTH UPDATE SYSTEMS AND METHODS FOR IMPROVED SCALABILITY, EFFICIENCY, AND PERFORMANCE

(71) Applicant: Darek Skalecki, Ottawa (CA)

(72) Inventor: Darek Skalecki, Ottawa (CA)

(73) Assignee: Ciena Corporation, Hanover, MD (US)

( * ) Notice: Subject to any disclaimer, the term of this patent is extended or adjusted under 35 U.S.C. 154(b) by 290 days.

(21) Appl. No.: 14/565,070

(22) Filed: Dec. 9, 2014

(65) Prior Publication Data

US 2016/0164739 A1    Jun. 9, 2016

(51) Int. Cl.
*H04L 12/24*   (2006.01)
*H04L 12/721*  (2013.01)

(52) U.S. Cl.
CPC ...... *H04L 41/0896* (2013.01); *H04L 41/0654* (2013.01); *H04L 41/12* (2013.01); *H04L 45/32* (2013.01)

(58) Field of Classification Search
None
See application file for complete search history.

(56) References Cited

U.S. PATENT DOCUMENTS

| | | | |
|---|---|---|---|
| 6,757,258 B1 | 6/2004 | Pillay-Esnault | |
| 6,820,134 B1 | 11/2004 | Zinin et al. | |
| 6,928,483 B1 | 8/2005 | Cain | |
| 7,222,191 B2 | 5/2007 | Dolganow et al. | |
| 7,376,086 B1 | 5/2008 | Paraschiv | |
| 7,729,253 B1 | 6/2010 | Khambatkone et al. | |
| 7,948,885 B1 | 5/2011 | Skalecki et al. | |
| 7,995,569 B2 | 8/2011 | Ashwood-Smith et al. | |
| 8,089,866 B2 | 1/2012 | Smith et al. | |
| 8,125,925 B2 | 2/2012 | Skalecki et al. | |
| 8,402,121 B2 | 3/2013 | Skalecki et al. | |
| 8,553,586 B2 | 10/2013 | Smith et al. | |
| 8,553,707 B2 | 10/2013 | Swinkels et al. | |
| 8,750,141 B2 | 6/2014 | Skalecki et al. | |
| 8,817,798 B2 | 8/2014 | Skalecki et al. | |
| 9,559,944 B2* | 1/2017 | Beller | H04L 45/128 |
| 9,847,951 B2* | 12/2017 | Htay | H04L 47/70 |
| 2004/0215787 A1* | 10/2004 | Gibson | H04L 12/5695 709/227 |
| 2010/0074101 A1 | 3/2010 | Skalecki et al. | |
| 2010/0091655 A1 | 4/2010 | Cortez et al. | |
| 2011/0026437 A1 | 2/2011 | Roja-Cessa et al. | |

(Continued)

*Primary Examiner* — Faruk Hamza
*Assistant Examiner* — Thinh D Tran
(74) *Attorney, Agent, or Firm* — Clements Bernard Walker PLLC; Christopher L. Bernard; Lawrence A. Baratta, Jr.

(57) ABSTRACT

A method, node, and network for reduced link bandwidth updates from a first node and a second node forming a link in a network includes, responsive to establishment or release of one or more connections on the link, flooding an update related thereto from only a master node that is one of the first node and the second node; responsive to a link failure associated with the link, flooding an update related thereto from both the first node and the second node; and, responsive to a change in parameters associated with the link, flooding an update related thereto from both the first node and the second node. The flooding can be part of a control plane associated with the network and/or to a Software Defined Networking (SDN) controller.

18 Claims, 3 Drawing Sheets

(56) References Cited

U.S. PATENT DOCUMENTS

| | | | |
|---|---|---|---|
| 2011/0116366 A1* | 5/2011 | Smith | H04L 45/02 370/225 |
| 2013/0242721 A1 | 9/2013 | Moynihan et al. | |
| 2013/0272318 A1 | 10/2013 | Swinkels et al. | |
| 2013/0297757 A1* | 11/2013 | Han | H04L 41/0806 709/222 |
| 2015/0094057 A1* | 4/2015 | Lu | H04W 8/005 455/434 |
| 2015/0172102 A1* | 6/2015 | DeCusatis | H04L 45/28 370/218 |
| 2015/0195162 A1* | 7/2015 | Gandham | H04L 41/04 709/206 |
| 2015/0256405 A1* | 9/2015 | Janardhanan | H04L 45/48 370/255 |
| 2015/0372902 A1* | 12/2015 | Giorgetti | H04L 45/64 370/219 |

\* cited by examiner

REDUCED LINK BANDWIDTH UPDATE SYSTEMS AND METHODS FOR IMPROVED SCALABILITY, EFFICIENCY, AND PERFORMANCE

FIELD OF THE DISCLOSURE

The present disclosure relates generally to networking systems and methods. More particularly, the present disclosure relates to reduced link bandwidth update systems and methods in control planes, Software Defined Networking (SDN), and the like.

BACKGROUND OF THE DISCLOSURE

Networks at various layers are being deployed with control planes, Software Defined Networking (SDN), Network Functions Virtualization (NFV), and the like. Control planes provide automatic allocation of network resources in an end-to-end manner. Exemplary control planes may include Automatically Switched Optical Network (ASON) as defined in ITU-T G.8080/Y.1304, Architecture for the automatically switched optical network (ASON) (02/2005), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections to route the connections and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

In control planes, SDN, and the like, network updates are flooded continually so that each node (in control planes) or an SDN controller (in SDN) have synchronized views of the network. As networks scale, the amount of updates can be difficult to process. For example, the updates can be flooded through Protocol Data Unit (PDU) packets or the like, with different types of routing PDUs for different types of updates. An exemplary routing PDU is a Link Bandwidth Update PDU to convey bandwidth updates on a link, which is typically the most frequently flooded routing PDU. Conventionally, many techniques are employed to reduce the effects of flooding PDUs in the network, including the Link Bandwidth Update PDUs. One exemplary technique includes setting bandwidth thresholds for when Link Bandwidth Updates are flooded, i.e. when the bandwidth threshold is crossed then Link Bandwidth Update PDUs are flooded. This is described, for example, in commonly assigned U.S. Pat. No. 7,729,253 issued on Jun. 1, 2010 and entitled "REDUCED AVAILABLE BANDWIDTH UPDATES," the contents of which are incorporated by reference herein. Another exemplary technique involves constraining links over which all Routing PDUs are flooded, i.e., manually creating Spanning Tree like paths to reach all nodes. This is described, for example, in commonly assigned U.S. Pat. No. 8,089,866 issued on Jan. 3, 2012 and entitled "SPANNING TREE FLOODING BACKBONE SYSTEMS AND METHODS FOR LINK STATE ROUTED NETWORKS," the contents of which are incorporated by reference herein. Yet another technique is to ensure only a single Routing PDU of a given type (e.g., Link Bandwidth Update) is originated within a given period of time, e.g. 2s.

As networks continue to scale, more effective techniques are required to improve scalability, efficiency, and performance of routing updates and the network in general.

BRIEF SUMMARY OF THE DISCLOSURE

In an exemplary embodiment, a method for reduced link bandwidth updates from a first node and a second node forming a link in a network includes, responsive to establishment or release of one or more connections on the link, flooding an update related thereto from only a master node that is one of the first node and the second node; and, responsive to an event besides the establishment or release of the one or more connections on the link, flooding an update related thereto from both the first node and the second node. The flooding can be performed in a control plane associated with the network and/or to a Software Defined Networking (SDN) controller. The control plane can be one of Automatically Switched Optical Network (ASON), Generalized Multi-Protocol Label Switching (GMPLS), and Optical Signaling and Routing Protocol (OSRP). The event can be a link failure or recovery associated with the link or a change in parameters associated with the link. The flooding can be used to update a topology database associated with the network, and wherein only bandwidth on the link for the master node is inspected for path computation. The topology database is up-to-date with respect to bandwidth on the link from a perspective of the master node and delayed with respect to a slave node. The master node can be selected between the first node and the second node based on predetermined criteria. The one or more connections are managed bi-directionally such that bandwidth for the one or more connections on the link from the first node to the second node is equal to bandwidth for the one or more connections on the link from the second node to the first node.

In another exemplary embodiment, a node, in a network, configured for reduced link bandwidth updates, includes one or more ports each forming an associated link in the network; and a controller configured to: responsive to establishment or release of one or more connections on the link, flood an update related thereto only if the node is a master node for the link; and, responsive to an event besides the establishment or release of the one or more connections on the link, flood an update related thereto regardless of whether or not the node is a master node. The controller can operate a control plane associated with the network and/or communicates to a Software Defined Networking (SDN) controller. The control plane can be one of Automatically Switched Optical Network (ASON), Generalized Multi-Protocol Label Switching (GMPLS), and Optical Signaling and Routing Protocol (OSRP). The event can be a link failure or recovery associated with the link or a change in parameters associated with the link. The controller can be configured to: maintain a topology database associated with the network based on updates received from other nodes; and, for path computation, inspect only bandwidth for a master node on a particular link. The topology database can be up-to-date with respect to bandwidth on the link from a perspective of the master node and delayed with respect to a slave node. The master node can be determined based on predetermined criteria. The one or more connections can be managed bi-directionally such that bandwidth for the one or more connections on the link from the first node to the second node is equal to bandwidth for the one or more connections on the link from the second node to the first node.

In a further exemplary embodiment, a network with reduced link bandwidth updates includes a plurality of nodes; a plurality of links interconnecting the plurality of nodes; wherein, for each of the plurality of links, associated nodes designate a master node, and, for bandwidth updates: responsive to establishment or release of one or more connections on a link, an update related thereto is flooded from only an associated master node for the link; and, responsive to an event besides the establishment or release of the one or more connections on the link, an update related thereto is flooded from both nodes associated with the link. A control plane can be operated in the network, and wherein the control plane is one of Automatically Switched Optical Network (ASON), Generalized Multi-Protocol Label Switching (GMPLS), and Optical Signaling and Routing Protocol (OSRP). The network can further include a Software Defined Networking (SDN) controller configured to receive flooded updates from the plurality of nodes. Only bandwidth on the link for the master node is inspected for path computation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, reduced link bandwidth update systems and methods in control planes, SDN, and the like are described to improve scalability, efficiency, and performance of routing updates and the network in general. The reduced link bandwidth update systems and methods propose to half the number of Link Bandwidth Update notifications by constraining the update to only one node on a link, i.e. a link in a network is formed between two nodes. Halving the number of Link Bandwidth Update PDUs that are flooded in the network halves the amount of processing required by each node in the network to process such PDUs. Furthermore, such halved processing requirements are most beneficial when connections are mesh restoring in the network due to failures, i.e. as failures occur, affected connections need to be released and re-established around the points of failure. As failed connections are released and re-established on links, the amount of available bandwidth changes on the links resulting in Link Bandwidth Update PDUs getting generated for these links. Thus, any processing gains obtained from halving the number of Link Bandwidth Update PDUs means more processing is available to expedite the release and re-establishment of the failed connections, i.e. mesh restoration performance is improved. Still furthermore, by halving the number of Link Bandwidth Update PDUs, network scalability is improved, as well as the use of control bandwidth is made more efficient. The reduced link bandwidth update systems and methods described herein are a complementary mechanism to reduce the effects of flooding Routing PDUs in the network, and are not intended to replace the existing mechanisms, i.e. they can all work in unison to reduce the effects of flooding Routing PDUs in the network to keep each node up-to-date with respect to the current network state.

Exemplary Network

Figure 1:
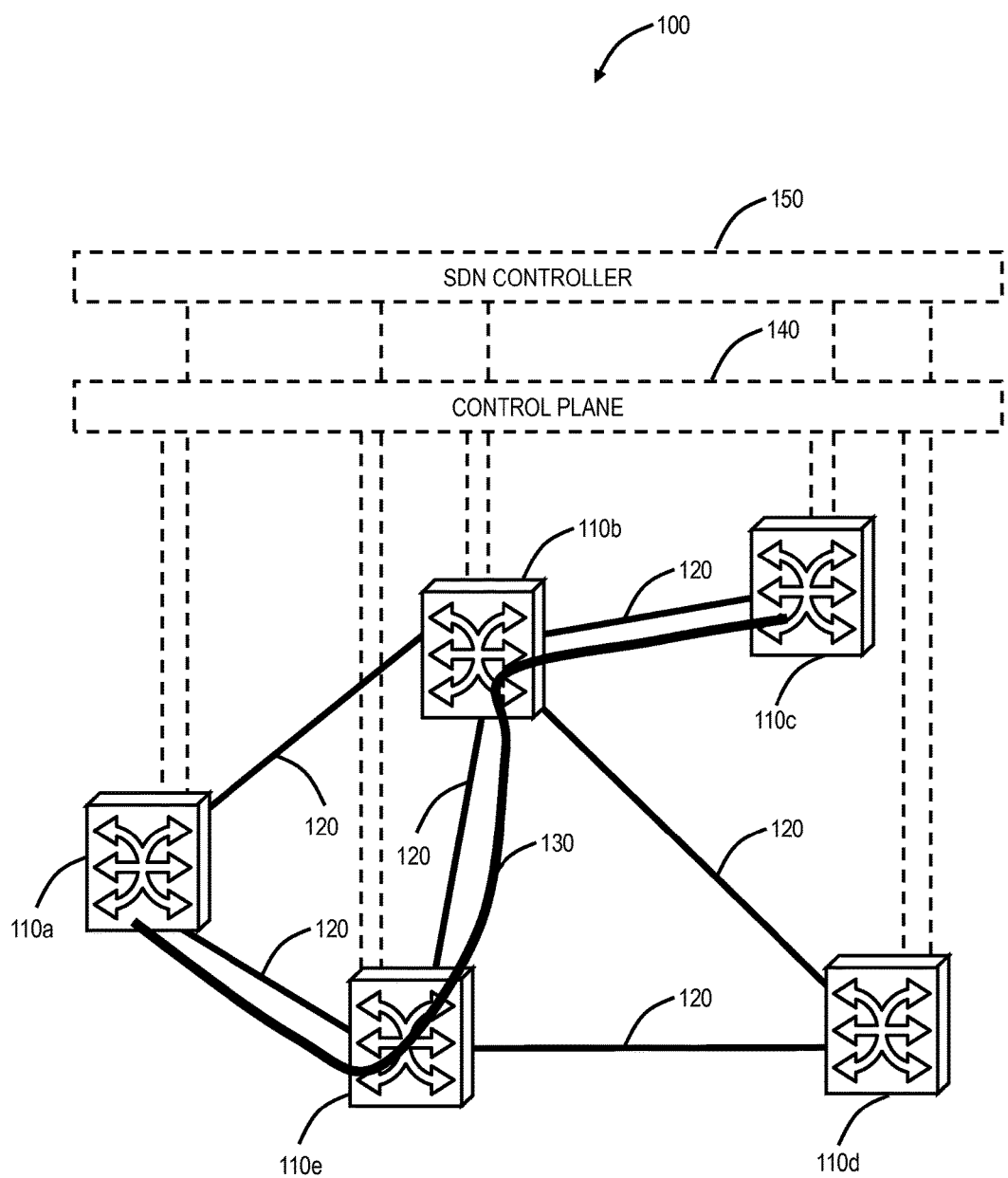
FIG. 1 is a network diagram of an exemplary network with five interconnected nodes.
Figure 2:
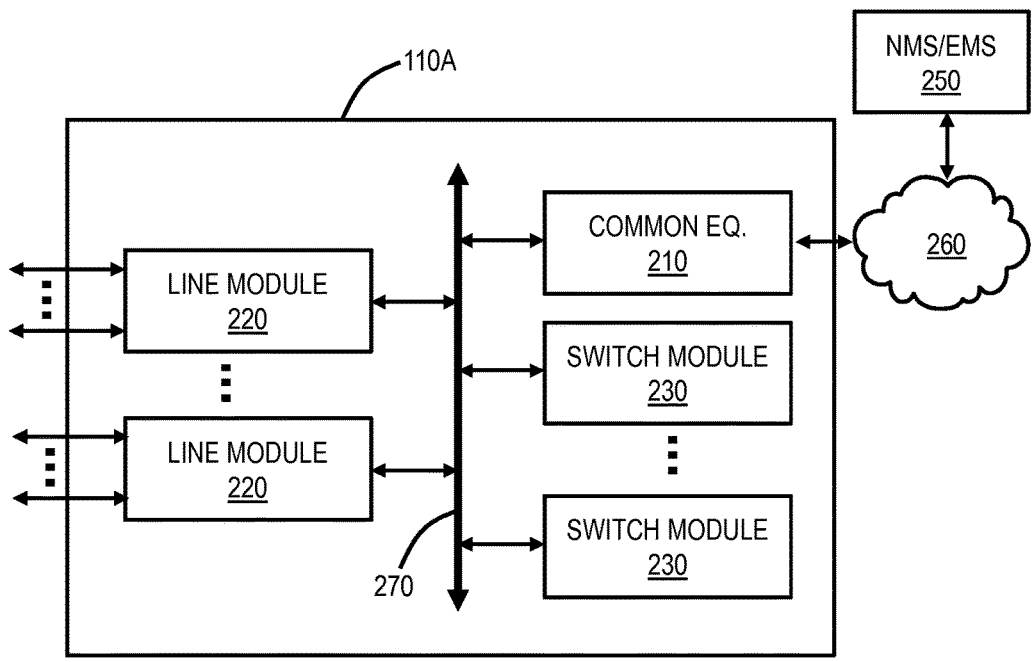
FIG. 2 is a block diagram of an exemplary network element for use with the systems and methods described herein.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. The nodes 110 communicate with one another over the links 120, such as through Wavelength Division Multiplexing (WDM), Optical Transport Network (OTN), Ethernet, Internet Protocol (IP), Multiprotocol Label Switching (MPLS), SONET/SDH, and the like. The nodes 110 can be network elements which include a plurality of ingress and egress ports forming the links 120. An exemplary network element 110A is illustrated in FIG. 2. The network 100 includes a connection 130 with ingress/egress at the nodes 110a, 110c and intermediate nodes 110b, 110e. The connection 130 can be a Sub-Network Connection (SNC), a Label Switched Path (LSP), an IP flow, or the like. The connection 130 is an end-to-end signaled path and from the view of the client signal contained therein, it is seen as a single network segment. Of course, the network 100 can include a plurality of connections. The nodes 110 can also be referred to interchangeably as network elements (NEs). The network 100 is illustrated, for example, as an interconnected mesh network, and those of ordinary skill in the art will recognize the network 100 can include other architectures, with additional nodes 110 or with less nodes 110, etc.

The network 100 can include a control plane 140 operating on and/or between the nodes 110a, 110b, 110c, 110d, 110e. The control plane 140 includes software, processes, algorithms, etc. that control configurable features of the network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, MPLS, Open Shortest Path First (OSPF), Intermediate System-Intermediate System (IS-IS), or the like. Those of ordinary skill in the art will recognize the network 100 and the control plane 140 can utilize any type of control plane for controlling the nodes 110 and establishing and maintaining connections therebetween, such as at and between Layers 0, 1, 2, 3+, etc. Layers 3+ include the network through application layers (Layers 3-7).

An SDN controller 150 can also be communicatively coupled to the network 100 through one or more of the nodes 110. SDN is an emerging framework which includes a centralized control plane decoupled from the data plane. SDN works with the SDN controller 150 knowing a full network topology through configuration or through the use of a controller-based discovery process in the network 100. The SDN controller 150 differs from a management system in that it controls the forwarding behavior of the nodes 110 only, and performs control in real time or near real time, reacting to changes in services requested, network traffic analysis and network changes such as failure and degradation. Also, the SDN controller 150 provides a standard northbound interface to allow applications to access network resource information and policy-limited control over network behavior or treatment of application traffic. The SDN controller 150 sends commands to each of the nodes 110 to control matching of data flows received and actions to be taken, including any manipulation of packet contents and forwarding to specified egress ports. Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

Exemplary Network Element/Node

Referring to FIG. 2, in an exemplary embodiment, a block diagram illustrates an exemplary network element 110A for use with the systems and methods described herein. In an exemplary embodiment, the exemplary network element 110A can be a network element that may consolidate the functionality of a Multi-Service Provisioning Platform (MSPP), Digital Cross Connect (DCS), Ethernet and/or Optical Transport Network (OTN) switch, Dense Wave Division Multiplexed (DWDM) platform, IP router, etc. into a single, high-capacity intelligent switching system providing Layer 0, 1, 2 and/or 3 consolidation. In another exemplary embodiment, the network element 110A can be any of an OTN Add/Drop Multiplexer (ADM), Reconfigurable Optical Add/Drop Multiplexer (ROADM), an MSPP, a Digital Cross-Connect (DCS), an optical cross-connect, an optical switch, a router, a switch, a DWDM platform, an access/aggregation device, etc. That is, the network element 110A can be any digital/optical system with ingress and egress digital/optical signals and switching therebetween of channels, timeslots, tributary units, etc. and/or photonic system with ingress and egress wavelengths and switching therebetween. While the network element 110A is generally shown as an optical network element, the systems and methods are contemplated for use with any network device including packet switches, bridges, routers, or the like.

In an exemplary embodiment, the network element 110A includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane and OAM&P processor, such as a controller 300 illustrated in FIG. 3, configured to operate the control plane, along with other functions as described herein. Through the common equipment 210, a user or network operator can gain OAM&P access to the network element 110A, either remotely or locally. The remote access can be via the DCN 260 and/or the management system 250, and the local access can be via a craft interface or management port associated with the network element 110A for switching functions, OAM functions, etc.

The network element 110A can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 120 to/from the network element 110A. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, etc. Functionally, the line modules 220 form one or more ports for network access and various functions associated therewith. That is, the line modules 220 can form the links 120 with their associated bandwidth.

Further, the line modules 220 can include a plurality of optical connections per module and each module may include a flexible rate support for any type of connection, such as, for example, 155 MB/s, 622 MB/s, 1 GB/s, 2.5 GB/s, 10 GB/s, 40 GB/s, 100 GB/s, 200 GB/s, 400 GB/s, N×1.25 GB/s, and any rate in between. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the network element 110A, and each line module 220 can include one or more physical ports. The switch modules 230 are configured to forward channels, wavelengths, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching), packet switching engines, and/or bridging or routing engines. The switch modules 230 can include redundancy as well, such as 1:1, 1:N, etc. In an exemplary embodiment, the switch modules 230 can provide wavelength switching such as through a Wavelength Selective Switch (WSS) or the like.

Those of ordinary skill in the art will recognize the network element 110A can include other components which are omitted for illustration purposes, and that the systems and methods described herein is contemplated for use with a plurality of different network elements with the network element 110A presented as an exemplary type of a network element. For example, in another exemplary embodiment, the network element 110A may not include the switch modules 230, but rather have the corresponding functionality in the line modules 220 (or some equivalent) in a distributed fashion. For the network element 110A, other architectures providing ingress, egress, and switching therebetween are also contemplated for the systems and methods described herein. In general, the systems and methods described herein contemplate use with any network element providing switching of channels, timeslots, tributary units, wavelengths, etc. with or without use of the control plane 140 or the SDN controller 150. Furthermore, the network element 110A is merely presented as one exemplary network element for the systems and methods described herein.

Exemplary Controller

Figure 3:
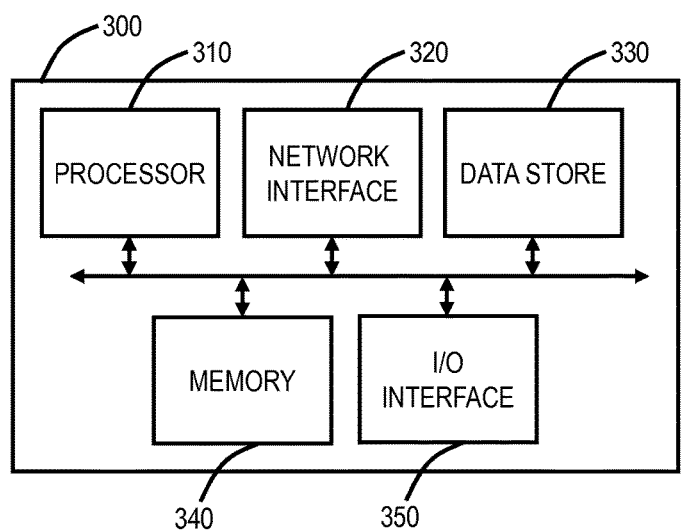
FIG. 3 is a block diagram of a controller to provide control plane processing and/or operations, administration, maintenance, and provisioning (OAM&P) for the network element of FIG. 2.

Referring to FIG. 3, in an exemplary embodiment, a block diagram illustrates a controller 300 to provide control plane processing and/or operations, administration, maintenance, and provisioning (OAM&P) for the network element 110A. The controller 300 can be part of common equipment, such as common equipment 210 in the network element 110A, or a stand-alone device communicatively coupled to the network element 110A via the DCN 260. The controller 300 can include a processor 310 which is a hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an Input/output (I/O) interface 350, and the like, all of which are communicatively coupled therebetween and with the processor 310.

The network interface 320 can be used to enable the controller 300 to communicate on the DCN 260, such as to communicate control plane information to other controllers, SDN controllers, to the management system 250, and the like. The network interface 320 can include, for example, an Ethernet card (e.g., 10BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate with other devices. Further, the I/O interface 350 includes components for the controller 300 to communicate with the other nodes, such as using overhead associated with OTN signals. Also, the controller 300 can implement various routing and signaling protocols to communicate with other nodes and controllers 300 such as, for example, Border Gateway Protocol (BGP), Open Shortest Path First (OSPF), Intermediate System-Intermediate System (IS-IS), Resource Reservation Protocol-Traffic Engineering (RSVP-TE), and the like.

In an exemplary embodiment, the controller 300 is configured to communicate with other controllers 300 in the network 100 to operate the control plane 140 and/or to communicate with the SDN controller. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP over the DCN 260. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within the Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within the Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

Network Updates

Link State (LS) routing protocols such as OSPF, IS-IS, and PNNI require an accurate view of the network topology (this includes knowledge regarding the presence of the nodes 110 and the links 120, their network address, and their state (up/down) as well as the value of all link metrics (e.g., their cost)) and bandwidth availability on such links in order to calculate optimal routes to a destination node. These LS routing protocols use topology-state update mechanisms to build a topology database at each node, typically conveying the topology status through flooding (flooding is defined as the broadcasting of control messages containing link/node status and reachability information through every link on every node in the network). OSPF uses link state advertisement (LSA), PNNI uses PNNI topology state elements (PTSE). Topology information in PNNI is distributed in PTSEs, which are encapsulated in PNNI topology state packets (PTSPs) and periodically flooded to other nodes in the domain through all available links. As with all LS protocols, both OSPF and PNNI use HELLO messages to establish and maintain link adjacencies. Router/Switch nodes and links go up/down in the course of operation (due to fiber cuts, hardware/software failures, etc.); link state routing protocols employ a flooding mechanism to disseminate this "change of state" information throughout the autonomous system. Simply put, this means when a router gets a new LSA message, it sends that information out to all of its directly connected networks. Or, if one of the links on a router changes state or its cost, the router generates a new LSA, which is flooded/broadcast out to all of its ports.

In the network 100, the nodes 110 are configured to continually send out updates, in an associated protocol, for the control plane 140, the SDN controller 150, and/or the management system 250. The associated protocol is based on the type of the control plane 140 (e.g., GMPLS, ASON, OSRP, etc.), the SDN controller 150, etc. These updates can be in the form of PDUs based on the associated protocol. Those of ordinary skill in the art recognize the various different types of updates that are flooded such as nodal updates, link updates, link bandwidth updates, etc. For example, nodal updates can relate to a new node coming online or a configuration change at an existing node. Similarly, link updates can relate to a new link coming online or a configuration change at an existing link. As described herein, the link bandwidth updates provide a notification related to a bandwidth change on a link, and these are typically the most frequently flooded updates as bandwidth on the link changes every time a connection on that link is established or terminated.

In various exemplary embodiments, the reduced link bandwidth update systems and methods half the number of link bandwidth updates through assuming, for Layer 0 and Layer 1, that connections on links are bidirectional and utilize the same amount of bandwidth in receive and transmit direction and thus bandwidth availability at the two ends of a link is identical. Here, with this assumption, only one node 110 needs to flood a link bandwidth update when bandwidth on the associated link 120 changes. In Layer 0 (photonic) and Layer 1 (time division multiplexed), it is a reasonable assumption that bandwidth availability on both ends is identical based on how networks are deployed and operated. Assuming a link X is associated with nodes A, B, an update stating Y bandwidth is available from node A to node B is equivalent to an update stating Y bandwidth is available from node B to node A. In this manner, only one of the nodes A, B needs to provide a link bandwidth update.

Reduced Link Bandwidth Update Method

Figure 4:
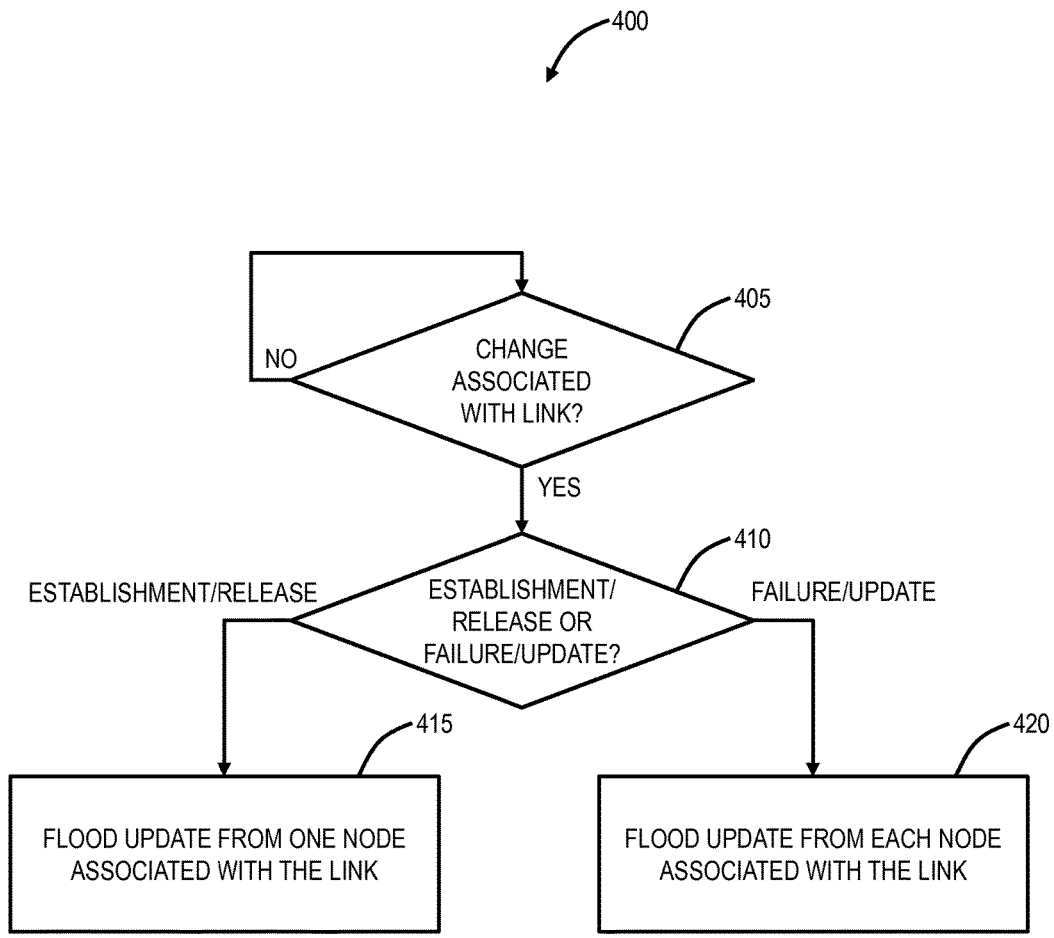
FIG. 4 is a flow chart of a reduced link bandwidth update method.

Referring to FIG. 4, in an exemplary embodiment, a flow chart illustrates a reduced link bandwidth update method 400. The reduced link bandwidth update method 400 is operated on a specific link 120 at the associated nodes 110 forming the specific link 120. The reduced link bandwidth update method 400 operates responsive to a change associated with the link (step 405). The change can be anything such as a bandwidth change due to a connection establishment or release, a link failure, a link update, etc. (step 410). As described herein, the connection establishment or release is where there is a normal addition or deletion of bandwidth on the link 120, such as through the control plane 140, the SDN controller 150, etc. Conventionally, when connections are being established or released in the network 100, for a particular link touched by a connection after being established or released on the link 120, nodes 110 at both ends of the link flood a link bandwidth update (e.g., a Link Bandwidth Update PDU) to all other nodes 110 in the network 100 to update bandwidth availability for the link 110 where such availability either includes or excludes the bandwidth of the connection. For example, if an Optical channel Transport Unit-4 (OTU4) link between nodes X and Y presently has 25 available Optical channel Data Unit-0 (ODU0) tributary slots and an ODU2 connection establishes on that link, then bandwidth availability for that link changes to 17 ODU0s and thus both nodes X and Y flood a Link Bandwidth Update PDU containing the new bandwidth availability of 17 ODU0s.

Again, the majority of networks only handle bidirectional connections and thus bandwidth availability on both ends of a link is always the same and thus it would suffice if only one node flooded around a Link Bandwidth Update PDU to update topology databases on all the nodes 110 in the network 100. Note, this assumption related to bidirectional connections is made due to the nature of Layer 0 and Layer 1 networks, but it can also extend to Layer 2, 3, etc. In the reduced link bandwidth update method 400, if the change (step 405) is related to the establishment or release of one or more connections on the link 120 (step 410), an update is flooded from one node 110 associated with the link 120 only (step 415). The two nodes 110 associated with the link 120 can determine who performs the flooding based on specific criteria, such as node identifier (ID) (e.g., higher node ID is chosen to perform the flooding). Here, the selected node 110 to perform the flooding is the master node and the other node 110 is the slave node. Note that master and slave relationship is always with respect to a particular link. That is, it is possible that a node may be a master for one link and slave for another link.

The reduced link bandwidth update method 400 halves the number of link bandwidth updates that are flooded in the network 110 and thus would halve the amount of CPU processing required by each node 110 (and associated controller 300) in the network 110 or SDN controller Furthermore, such halved CPU processing requirements would be of most benefit when connections are mesh restoring in the network 100 due to failures, i.e. as failures occur, affected connections need to be released and re-established around the points of failure and thus any CPU processing gains obtained from the reduced link bandwidth update method 400 would mean more CPU processing is available to expedite the release and re-establishment of the failed connections, i.e. mesh restoration performance is improved. Still furthermore, by halving the number of link bandwidth updates, network scalability is improved, as well as the use of control bandwidth is made more efficient.

Note, the optimization in the step 415 is only applied to link bandwidth updates related to connection establishments and releases, and is not intended to be used for link failures and updates to any TE attributes of the link. That is, when a link fails (step 410), then both end nodes 110 flood an indication the link 120 is failed (step 420). Furthermore, when Traffic Engineering (TE) attributes, such as Admin Weight, Latency, or Shared Risk Link Group (SRLG) change, then again each end floods the new values independently as these values may be changed/set on either end of the link (step 420). That is, when an event occurs besides the connection establishments and releases, updates are flooded from each node associated with the link (step 420). Again, it is worth noting that Link Bandwidth Update PDUs are the most frequently flooded PDUs in the network 100.

Thus, for each link 120, there will be a master node and a slave node. The determination of such can be network wide based on predetermined criteria. It is unique to select one node at either side of a link to be a master node, and for such node being responsible for flooding Link Bandwidth Update PDUs when bandwidth availability changes on the link, while the other node only floods Link Bandwidth Update PDUs at regular intervals or whenever the link fails or its TE parameters change, per normal behavior. Furthermore, path computation only inspects bandwidth availability at the side of the link flooded by the master node. Both nodes will originate updates that are flooded, but the slave node will do so less frequently than the master node. That is, the master node will always flood link bandwidth updates whereas the slave node will not. One advantage of the reduced link bandwidth update method 400 is that it does not require modification to the existing Link State Protocols. The nodes 110 operate per normal behavior with the slave node constraining flooding associated with link bandwidth updates.

At each node 110 and/or the SDN controller 150, the link bandwidth updates are received and used to update a topology database of the network 100. The reduced link bandwidth update method 400 contemplates standard operation of the topology database as per existing behavior. With the reduced link bandwidth update method 400, the topology database will only be out of synch with respect to bandwidth on the link 120 at the slave node. Thus, for path computation, existing behavior requires modification. The path computation, when determining whether a particular link 120 has sufficient bandwidth for a new connection, only the master node side of the link 120 needs to be examined for bandwidth availability as it would have the most up to date values, based on the reduced flooding. Conventionally, bandwidth availability for both sides of a link is examined. Thus, the reduced link bandwidth update method 400 also improves path computation performance.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for reduced link bandwidth updates from a first node and a second node forming ends of a link in a network, the method comprising:
   responsive and subsequent to establishment or release of one or more connections on the link at the first node and the second node, flooding an update related thereto to all other nodes in the network from only a master node that is one of the first node and the second node, wherein the master node is selected between the first node and the second node based on a unique network identifier of each node which is known networkwide and designation of the master node is based on the link such that a node could be both a master node and a slave node for different links; and
   responsive to an event other than the establishment or release of the one or more connections on the link, flooding the update related thereto from both the first node and the second node,
   wherein the one or more connections operate at one or both of Layer 0 and Layer 1 and the flooded update includes bandwidth available at the one or both of Layer 0 and Layer 1.

2. The method of claim 1, wherein the flooding is performed in a control plane associated with the network and/or to a Software Defined Networking (SDN) controller.

3. The method of claim 2, wherein the control plane is one of Automatically Switched Optical Network (ASON), Generalized Multi-Protocol Label Switching (GMPLS), and Optical Signaling and Routing Protocol (OSRP).

4. The method of claim 1, wherein the event is a link failure or recovery associated with the link or a change in parameters associated with the link.

5. The method of claim 1, wherein the flooding is used to update a topology database associated with the network, and wherein only bandwidth on the link for the master node is inspected for path computation.

6. The method of claim 5, wherein the topology database is up-to-date with respect to bandwidth on the link from a perspective of the master node and delayed with respect to a slave node.

7. The method of claim 1, wherein the one or more connections are managed bi-directionally such that bandwidth for the one or more connections on the link from the first node to the second node is equal to bandwidth for the one or more connections on the link from the second node to the first node.

8. A node, in a network, configured for reduced link bandwidth updates, the node comprising:
   one or more ports each forming an associated link in the network; and
   a controller configured to:
      responsive and subsequent to establishment or release of one or more connections on the link at a first node and a second node, flood an update related thereto to all other nodes in the network only if the node is a master node for the link, wherein the master node is determined based on a unique network identifier of each node which is known networkwide and designation of the master node is based on the link such that a node could be both a master node and a slave node for different links; and
      responsive to an event other than the establishment or release of the one or more connections on the link, flood the update related thereto regardless of whether or not the node is a master node, wherein the one or more connections operate at one or both of Layer 0 and Layer 1 and the flooded update includes bandwidth available at the one or both of Layer 0 and Layer 1.

9. The node of claim 8, wherein the controller operates a control plane associated with the network and/or communicates to a Software Defined Networking (SDN) controller.

10. The node of claim 9, wherein the control plane is one of Automatically Switched Optical Network (ASON), Generalized Multi-Protocol Label Switching (GMPLS), and Optical Signaling and Routing Protocol (OSRP).

11. The node of claim 8, wherein the event is a link failure or recovery associated with the link or a change in parameters associated with the link.

12. The node of claim 8, wherein the controller configured to:
   maintain a topology database associated with the network based on updates received from other nodes; and
   for path computation, inspect only bandwidth for a master node on a particular link.

13. The node of claim 12, wherein the topology database is up-to-date with respect to bandwidth on the link from a perspective of the master node and delayed with respect to a slave node.

14. The node of claim 8, wherein the one or more connections are managed bi-directionally such that bandwidth for the one or more connections on the link from the first node to the second node is equal to bandwidth for the one or more connections on the link from the second node to the first node.

15. A network with reduced link bandwidth updates, the network comprising:
   a plurality of nodes; and
   a plurality of links interconnecting the plurality of nodes;
   wherein, for each of the plurality of links, associated nodes designate a master node, and, for bandwidth updates:
      responsive and subsequent to establishment or release of one or more connections on a link at a first node and a second node, an update related thereto is flooded to all other nodes in the network from only an associated master node for the link, wherein the associated master node is determined based on a unique network identifier of each node which is known networkwide and designation of the master node is based on the link such that a node could be both a master node and a slave node for different links; and
      responsive to an event other than the establishment or release of the one or more connections on the link, the update related thereto is flooded from both nodes associated with the link,
   wherein the one or more connections operate at one or both of Layer 0 and Layer 1 and the flooded update includes bandwidth available at the one or both of Layer 0 and Layer 1.

16. The network of claim 15, wherein a control plane is operated in the network, and wherein the control plane is one of Automatically Switched Optical Network (ASON), Generalized Multi-Protocol Label Switching (GMPLS), and Optical Signaling and Routing Protocol (OSRP).

17. The network of claim 15, further comprising a Software Defined Networking (SDN) controller configured to receive flooded updates from the plurality of nodes.

18. The network of claim 15, wherein only bandwidth on the link for the master node is inspected for path computation.

* * * * *